(12) United States Patent
Kang et al.

(10) Patent No.: US 10,693,625 B2
(45) Date of Patent: Jun. 23, 2020

(54) SECURITY PROCESSOR, APPLICATION PROCESSOR INCLUDING THE SAME, AND OPERATING METHOD OF SECURITY PROCESSOR

(71) Applicant: SAMSUNG ELECTRONICS CO., LTD., Suwon-Si, Gyeonggi-Do (KR)

(72) Inventors: Ji-Su Kang, Seoul (KR); Kyoung-Moon Ahn, Seoul (KR); Yong-Ki Lee, Yongin-Si (KR); Ki-Seok Bae, Yongin-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 185 days.

(21) Appl. No.: 15/485,857

(22) Filed: Apr. 12, 2017

(65) Prior Publication Data
US 2018/0152288 A1    May 31, 2018

(30) Foreign Application Priority Data
Nov. 25, 2016    (KR) .......................... 10-2016-0158634

(51) Int. Cl.
*H04L 9/00* (2006.01)
*G06F 21/55* (2013.01)
*H04L 9/06* (2006.01)

(52) U.S. Cl.
CPC .............. *H04L 9/002* (2013.01); *G06F 21/55* (2013.01); *G06F 21/556* (2013.01); *H04L 9/003* (2013.01);
(Continued)

(58) Field of Classification Search
CPC ......... H04L 9/002; H04L 9/003; H04L 9/006; H04L 9/0662; H04L 2209/04; H04L 2209/08; G06F 21/55; G06F 21/556
(Continued)

(56) References Cited

U.S. PATENT DOCUMENTS 4,543,641 A * 9/1985 Fukuta .................. G06F 7/4915
  708/624
5,042,001 A * 8/1991 Brightman .............. G06F 7/544
  708/490
(Continued)

FOREIGN PATENT DOCUMENTS

CN    101197668 A    6/2008
JP    4423900 B2    3/2010
(Continued)

OTHER PUBLICATIONS

Cheol, Jae et al., "Randomized Signed-Scalar Multiplication of ECC to Resist Power Attacks," CHES 2002, ONCS 2523, pp. 551-563, 2003.

*Primary Examiner* — Alexander Lagor
*Assistant Examiner* — Moeen Khan
(74) *Attorney, Agent, or Firm* — Volentine, Whitt & Francos, PLLC

(57) ABSTRACT

An application processor includes a security processor. An operating method of the security processor includes generating a recoder input including a digit-unit multiplier and a reference bit. At least one random bits having a random value are generated. When the recoder input has a predetermined pattern, the recoder input is converted into a first recoding value or a second recoding value according to a random bit corresponding to the recoder input to generate a recoding result.

20 Claims, 18 Drawing Sheets

(52) U.S. Cl.
CPC ............ *H04L 9/006* (2013.01); *H04L 9/0662* (2013.01); *H04L 2209/04* (2013.01); *H04L 2209/08* (2013.01)

(58) Field of Classification Search
USPC .......................................................... 713/189
See application file for complete search history.

(56) References Cited

U.S. PATENT DOCUMENTS

| | | | |
|---|---|---|---|
| 5,144,576 A * | 9/1992 | Briggs .................. | G06F 7/4824 708/493 |
| 7,853,013 B2 | 12/2010 | Vasyltsov et al. | |
| 8,804,952 B2 | 8/2014 | Al-Somani | |
| 8,861,722 B2 | 10/2014 | Gammel et al. | |
| 2004/0039928 A1 * | 2/2004 | Elbe ........................ | G06F 21/72 713/189 |
| 2004/0252621 A1 * | 12/2004 | Cho ........................ | B82Y 10/00 369/126 |
| 2005/0198093 A1 * | 9/2005 | Son ......................... | G06F 7/728 708/625 |
| 2006/0280296 A1 * | 12/2006 | Vasyltsov ............... | G06F 7/725 380/28 |
| 2008/0240443 A1 | 10/2008 | Vuillaume et al. | |
| 2013/0262544 A1 * | 10/2013 | Lee ......................... | G06F 7/533 708/250 |
| 2015/0154005 A1 * | 6/2015 | Tseng ..................... | G06F 7/5306 708/190 |
| 2015/0326389 A1 | 11/2015 | Johnson et al. | |
| 2016/0065361 A1 | 3/2016 | Choi et al. | |
| 2016/0292684 A1 | 10/2016 | Youn | |
| 2017/0357484 A1 * | 12/2017 | Dyka ..................... | G06F 7/5324 |

FOREIGN PATENT DOCUMENTS

| KR | 1020130111721 | 10/2013 |
|---|---|---|
| KR | 101492054 | 2/2015 |

* cited by examiner

FIG. 6

| $b_{2i+1}$ | $b_{2i}$ | $b_{2i-1}$ (Ref bit) | Radom bit | Recoding value | $b'_{2i+1}$ (Next Ref bit) |
|---|---|---|---|---|---|
| 0 | 0 | 0 | Don't care | 0 | 0 |
| 0 | 0 | 1 | Don't care | 1 | 0 |
| 0 | 1 | 0 | Don't care | 1 | 0 |
| 0 | 1 | 1 | 1 | 2 | 0 |
|   |   |   | 0 | −2 | 1 |
| 1 | 0 | 0 | 1 | −2 | 1 |
|   |   |   | 0 | 2 | 0 |
| 1 | 0 | 1 | Don't care | −1 | 1 |
| 1 | 1 | 0 | Don't care | −1 | 1 |
| 1 | 1 | 1 | Don't care | 0 | 1 |

FIG. 7

| Recoding Value | sel0 | sel1 | sel2 | sel3 |
|---|---|---|---|---|
| -2 | 1 | 0 | 1 | 0 |
| -1 | 1 | 0 | 0 | 1 |
| 0 | 0 | 0 | 0 | 0 |
| 1 | 0 | 1 | 0 | 1 |
| 2 | 0 | 1 | 1 | 0 |

| $b_{2i+1}$ | $b_{2i}$ | bref | Radom bit | Recoding value | bnext_ref |
|---|---|---|---|---|---|
| 0 | 0 | 0 | a | 0 | 0 |
| | | | !a | −4 | 1 |
| 0 | 0 | 1 | b | 1 | 0 |
| | | | !b | −3 | 1 |
| 0 | 1 | 0 | c | 1 | 0 |
| | | | !c | −3 | 1 |
| 0 | 1 | 1 | d | 2 | 0 |
| | | | !d | −2 | 1 |
| 1 | 0 | 0 | e | −2 | 1 |
| | | | !e | 2 | 0 |
| 1 | 0 | 1 | f | −1 | 1 |
| | | | !f | 3 | 0 |
| 1 | 1 | 0 | g | −1 | 1 |
| | | | !g | 3 | 0 |
| 1 | 1 | 1 | h | 0 | 1 |
| | | | !h | 4 | 0 |

FIG. 15

| $b_{2i+1}$ | $b_{2i}$ | $b_{2i-1}$ (Ref bit) | Recoding value | Radom bit | sel0 | sel1 | sel2 | sel3 |
|---|---|---|---|---|---|---|---|---|
| 1 | 0 | 0 | -2 | Don't care | 1 | 0 | 1 | 0 |
| 1 | 0 | 1 | -1 | Don't care | 1 | 0 | 0 | 1 |
| 1 | 1 | 0 | | | | | | |
| 0 | 0 | 0 | 0 | 0 | 0 | 0 | 0 | 0 |
| 1 | 1 | 1 | | 1 | 1 | 1 | 1 | 1 |
| 0 | 0 | 1 | 1 | Don't care | 0 | 1 | 0 | 1 |
| 0 | 1 | 0 | | | | | | |
| 0 | 1 | 1 | 2 | Don't care | 0 | 1 | 1 | 0 |

SECURITY PROCESSOR, APPLICATION PROCESSOR INCLUDING THE SAME, AND OPERATING METHOD OF SECURITY PROCESSOR

CROSS-REFERENCE TO RELATED APPLICATION

This non-provisional patent application claims priority under 35 U.S.C. § 119 to Korean Patent Application No. 10-2016-0158634, filed on Nov. 25, 2016 in the Korean Intellectual Property Office, the disclosure of which is incorporated herein in its entirety by reference.

BACKGROUND

1. Technical Field

The present disclosure relates to a security processor. More particularly, the present disclosure relates to a security processor, an application processor including the same, and an operating method of the security processor, which effectively defend against a side channel attack.

2. Discussion of Related Art

A security processor executes a security algorithm such as an encrypting operation by using information requiring security like a private key. External leakage of secret information of a security calculator may be referred to as a side channel, and an attack method using the side channel may be referred to as a side channel attack (SCA). The security calculator needs to use a countermeasure against the SCA.

A template attack is a strong SCA. It is assumed that an attacker has the same device as a device to be attacked, and an environment which is not limited in number of inputs and operations. The attacker configures a template by using a corresponding environment. Thus, in an actual attack on a device, secret information may be obtained by using a power measurement result obtained through measurement of when an arithmetic operation is performed.

A countermeasure such as masking or hiding has been proposed against the SCA. In a general countermeasure, however, a circuit area of a security calculator or average consumption power can largely increase, and moreover, effective defense cannot be made against a power analysis attack.

SUMMARY

The present disclosure provides a security processor, an application processor including the same, and an operating method of the security processor, which effectively defend against an SCA in addition to minimizing average power consumption or an increase in an overhead of performance.

According to an aspect of the present disclosure, an operating method of a security processor includes providing a recoder input including a digit-unit multiplier and a reference bit to a recoder. A random signal including at least one random bits is provided to the recoder. When the recoder input has a predetermined pattern, the operating method includes generating a recoding result by converting the recoder input into a first recoding value or a second recoding value according to the random signal.

According to another aspect of the present disclosure, a security processor includes a recoder configured to receive a recoder input including a digit-unit multiplier and a reference bit to output at least one control signals as a recoding result. A random signal generator is configured to generate a random signal so that a recoding result corresponding to a recoder input having a predetermined pattern is randomly changed. A calculator is configured to perform a partial multiplication by using a multiplicand of N bits and the at least one control signals, where N is an integer equal to or more than two.

According to another aspect of the present disclosure, an operating method of a security processor includes generating first to nth control signals through a recoding operation on a recoder input having a first pattern. A partial multiplication result of a partial multiplication on a multiplier and a multiplicand is generated by using the first to nth control signals. A multiplication result of a multiplication on the multiplier and the multiplicand is generated by using the generated partial multiplication result. In multiple recoding operations, first to nth control signals having bits of a first group and first to nth control signals having bits of a second group are randomly generated based on the same recoder input having the first pattern.

BRIEF DESCRIPTION OF THE DRAWINGS

Embodiments of the inventive concepts of the present disclosure will be more clearly understood from the following detailed description taken in conjunction with the accompanying drawings in which:

FIG. 6 is a table showing an example of numerical values included in a recoding table included in a recoder;

FIG. 7 is a table showing an example of a control signal generated based on a recoding result according to an embodiment;

FIG. 9 is a diagram illustrating an example where recoding values are randomly changed with respect to the same multiplier, based on the table of FIG. 6;

FIG. 13 is a table showing another example of numerical values included in a recoding table included in a recoder;

FIGS. 15 and 16 are diagrams illustrating an example of a recoding operation and a partial multiplication according to another embodiment.

DETAILED DESCRIPTION OF THE EMBODIMENTS

Hereinafter, embodiments will be described in detail with reference to the accompanying drawings.

Figure 1:
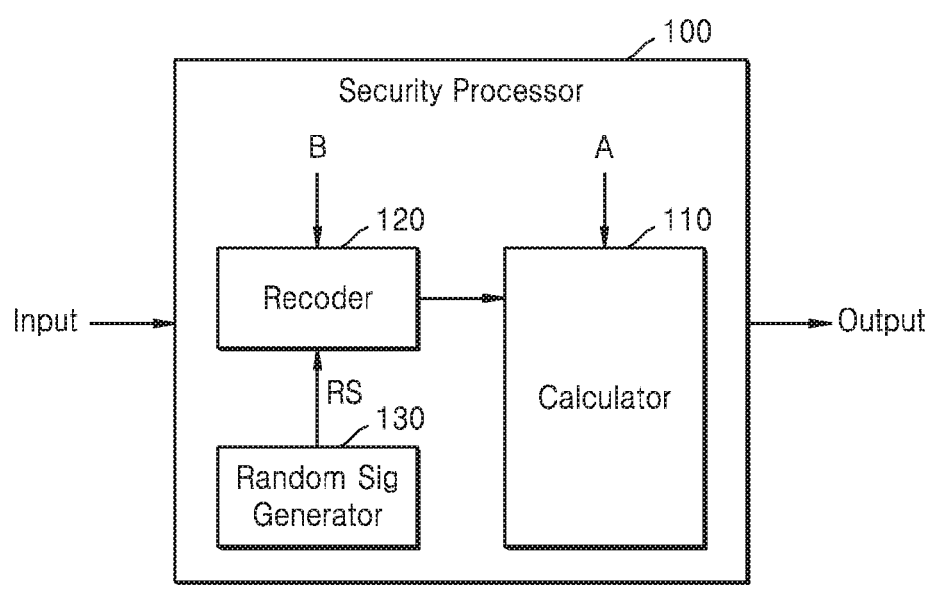
FIG. 1 is a diagram illustrating a security processor according to an exemplary embodiment.

FIG. 1 is a diagram illustrating a security processor according to an exemplary embodiment.

A security processor 100 may perform an arithmetic operation using secret information. Since the security processor 100 performs an arithmetic operation, the security processor 100 may be referred to as a security calculator. For example, the security processor 100 may perform an encrypting/decrypting operation using a private key in a public key infrastructure (PKI). The security processor 100 may perform various kinds of arithmetic operations in association with the encrypting/decrypting operation. For example, the security processor 100 may perform all arithmetic operations for encrypting or decrypting data or may perform only some arithmetic operations necessary for encryption or decryption.

With reference to the security processor 100, a security processor 100 is a processor for a computer system and is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A security processor 100 is configured to execute software instructions in order to perform functions as described in the various embodiments herein. A security processor 100 may be a general purpose processor that is specially configured as described herein, such as to include a recoder 120 and random signal generator 130 described below. A security processor 100 may also be a microprocessor, a microcomputer, a processor chip, a controller, a microcontroller, or a digital signal processor (DSP). A security processor 100 may also be a logical circuit, including a programmable gate array (PGA) such as a field programmable gate array (FPGA), or another type of circuit that includes discrete gate and/or transistor logic. A security processor 100 may be a central processing unit (CPU). Additionally, any processor described herein may include multiple processors, parallel processors, or both. Multiple processors may be included in, or coupled to, a single device or multiple devices.

In the security processor 100, one of the fundamental arithmetic operations may be multiplication. Particularly, in a case where the security processor 100 executes a public key algorithm, arithmetic operations (addition/subtraction, multiplication, modular operation, etc.) on a relatively large number may be performed in the security processor 100. In a case where the size of a corresponding operator is Rivest Shamir Adleman (RSA), when the size of the corresponding operator is a minimum of 1,024 bits, an arithmetic operation may be considered to be a stable arithmetic operation.

For an arithmetic operation using an operator which is large, the security processor 100 may use an arithmetic operation method based on a digit-serial multiplier. An algorithm 1 for a general serial multiplication and an algorithm 2 for performing a digit-serial multiplication may be as follows.

---

Algorithm 1: Serial multiplication

Inputs: Positive integers A and B, where $B = \Sigma_{i=0}^{n-1} b_i 2^i$, n is the operand size, and $b_i = 0$ or 1
Output: The result of the multiplication: $C \leftarrow A * B$
  1. $C \leftarrow 0$
  2. For i from n − 1 downto 0 do
     A. $T \leftarrow C * 2$
     B. $T \leftarrow T + b_i * A$
     C. $C \leftarrow T$
  3. Return C

---

Algorithm 2: Digit-serial Multiplication

Inputs: Positive integers A and B, where $B = \Sigma_{i=0}^{k-1} b_i 2^{di}$, n is the operand size, d is the digit size, $k = \lceil n/d \rceil$, and $b_i = [0,1,2, \ldots , 2^d - 1]$
Output: The result of the multiplication: $C \leftarrow A * B$
  1. $C \leftarrow 0$
  2. For i from k − 1 downto 0 do
     A. $T \leftarrow C * 2^d$
     B. $T \leftarrow T + b_i * A$
     C. $C \leftarrow T$
  3. Return C

---

Referring to the algorithms 1 and 2, the digit-serial multiplication may perform an arithmetic operation on several bits ($b_i$) of a multiplier (for example, B) at a time and may easily extend from the general serial multiplication.

In performing the multiplication, power consumed by the security processor 100 is affected by a $b_i$ value. Therefore, in the multiplication, when a multiplier is the same as a multiplicand and an arithmetic operation is therefore frequently performed, a B value is leaked by a template attack. Thus, secret information about the security processor 100 such as a private key or the like may be analyzed.

Generally, a hiding technique and a masking technique have been proposed as a countermeasure to an SCA. The hiding technique is a method of decreasing side channel signals or increasing noise to reduce a change in power consumption. However, when using the hiding technique, a circuit area and average power consumption increase by twice or more. Moreover, since an actual arithmetic operation is performed only when a clock signal is in only a certain state (for example, a predetermined low state), overall performance is reduced.

In a general masking technique, by performing a masking operation before an encrypting operation, inputs used for the encrypting operation are randomized. Since an unmasking operation is additionally performed after the encrypting operation in order to offset the masking operation, the general masking technique is a method of calculating an equivalent arithmetic operation result as a result. However, in the masking technique, when a multiplier or a multiplicand corresponds to 0 in a multiplication, there is no masking effect. For this reason, there is still a risk of leaking the secret information about the security processor 100.

The security processor 100 according to an embodiment of the present disclosure proposes technology where a random characteristic is added to a recoding operation of a multiplier applied for an efficient implementation of a multiplication. The use of a random characteristic in a recoding operation efficiently defends against a template attack. As described herein, the recoding operation may involve an algorithm such as used in booth recoding, wherein the same algorithm is used by the same type of devices for performing multiplication. The devices may number in the millions, so that the underlying recoding operation may consistently obtain the same results based on the same inputs for each of the millions of devices.

According to an embodiment of the present disclosure, for example, a random characteristic may be assigned to a multiplicand (or a multiplier) of a multiplication by using a random signal which is generated in the security processor 100. Thus, even when an input of the multiplication is the same, an input used in performing an actual multiplication may be randomly changed. This introduces random variability to the algorithm used for the recoding operation. The change to the input used in the actual multiplication may mean that the original recoding input is randomly replaced, revised, altered, supplemented and so on, so that the input used in the actual multiplication cannot be predicted or made predictable in advance. Alternatively, according to an embodiment, an element for generating a random bit (or a random signal) may be provided outside the security processor 100. The security processor 100 may externally receive the random bit and may assign a random characteristic to the multiplicand (or the multiplier) of the multiplication, based on the received random bit. The random variability is still introduced to the algorithm used for the recoding operation. Accordingly, power consumption may be randomly changed in performing an actual multiplication. Thus, the vulnerability to the template attack is removed.

The security processor 100 according to an embodiment may include a calculator 110, a recoder 120, and a random signal generator 130. The security processor 100 may perform various kinds of security operations such as an RSA-based encrypting operation and may perform a security operation on an input to generate an output. Also, the security processor 100 may perform multiple multiplications in a process of generating the output.

The calculator 110 may perform a multiplication on a multiplicand A and a multiplier B. For example, in order to generate a result of a multiplication on a multiplicand and a multiplier, the calculator 110 may perform a partial multiplication on a digit-unit (for example, 2-bit) multiplier multiple times. The recoder 120 may receive at least one bits corresponding to the multiplier B and may perform a recoding operation on the received bits to output a recoding result. For example, the recoding operation may correspond to a booth recoding operation suitable for logic devices for implementing the digit-serial multiplication. According to an embodiment, if a recoder input has a certain (predetermined) pattern, a random characteristic may be assigned to the recoder input. For example, in performing multiple partial multiplications, different recoding results may be randomly generated by performing the multiple partial multiplications on the recoder input having the certain input. Therefore, in an embodiment, a recoding operation performed by the recoder 120 may correspond to a modified booth recoding operation. As set forth herein, the same algorithm may be used for recoding operations in numerous devices of the same type (i.e., manufacturer, model etc), and the introduction of random variability to the algorithm used for the recoding operation ensures that recoding values cannot be made predictable outside of the particular device executing the algorithm.

As described above, multiple partial multiplications may be performed for performing an A*B operation, and one recoding operation may be performed in correspondence with each of the partial multiplications. Also, since a recoding result of a recoding operation on a recoder input having a certain pattern is randomly changed, at least one partial multiplication results may be changed by performing a multiplication on the same multiplicand A and the same multiplier B. Thus, an operation of compensating for a difference of the partial multiplication results may be performed. For example, when the random characteristic is reflected in a current partial multiplication and thus a partial multiplication result is changed, an operation of compensating for the difference of the partial multiplication results may be performed in a next partial multiplication.

According to an embodiment, the recoder 120 may receive a random signal RS from the random signal generator 130 and may generate a recoding result having a random characteristic, based on the received random signal RS. The random signal generator 130 may be an element for generating a random signal RS in various manners. For example, a random generator (RNG) or a pseudo-random generator (PRNG) may be used as the random signal generator 130. The random signal RS may include at least one random bits. For example, one partial multiplication may use one random bit. Thus, when it is assumed that the calculator 110 simultaneously performs two partial multiplications, the random signal RS may include two random bits. The randomness in a random generator may be generated based on an observation of a physical phenomenon, such as an environmental or other natural phenomenon. Physical phenomenons include numerous types of noise levels, temperatures, power levels and so on. Alternatively, pseudo-random generators may generate reproducible pseud-random numbers using a seed value and a computational algorithm. The randomness introduced herein may be unreproducible, so that two devices of the same type existing in the same place (e.g., in the same room) and at the same time may not consistently introduce the same randomness to the algorithm used for the recoding operation.

For example, if a recoder input has a first pattern, the recoder 120 may generate a recoding result corresponding to a first recoding value or a recoding result corresponding to a second recoding value, based on the random signal RS. A detailed operation will be described below, but the recoding result may be supplied to the calculator 110 in a certain (predetermined) control signal form. The calculator 110 may perform an arithmetic operation using the multiplicand A and the recoding result (or a control signal) and may output a partial multiplication result as an arithmetic operation result. The calculator 110 may generate multiple partial multiplication results and may perform an accumulating operation on the generated partial multiplication results to generate a multiplication result of a multiplication on the multiplicand A and the multiplier B.

Figure 2:
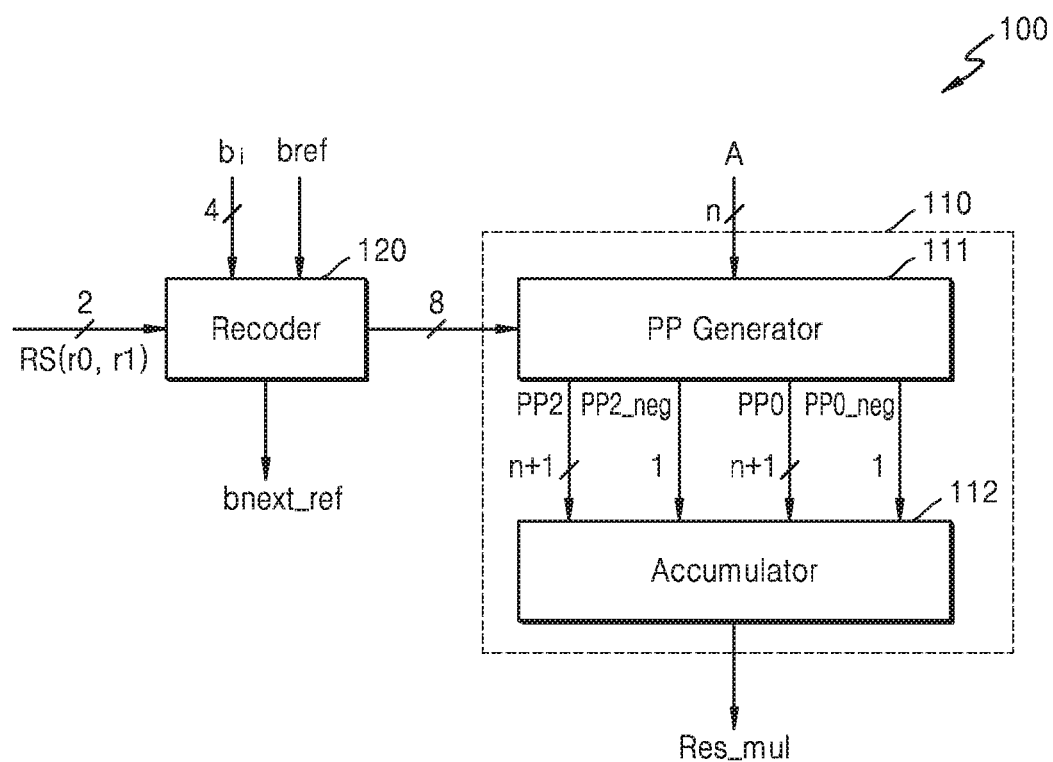
FIG. 2 is a block diagram illustrating a detailed implementation example of the security processor of FIG. 1.

FIG. 2 is a block diagram illustrating a detailed implementation example of the security processor 100 of FIG. 1.

Referring to FIGS. 1 and 2, the calculator 110 may include a partial multiplication generator 111 and an accumulator 112. The calculator 110 may perform a multiplication on a multiplicand A having a value of n bits and a multiplier B having a certain (predetermined) number of bits (for example, n bits) to output a multiplication result Res_mul. The multiplication may be performed based on multiple partial multiplications. For example, a partial multiplication result of a partial multiplication on the multiplicand A having the value of the n bits and a digit-unit (for example, 2-bit) multiplier B may be generated through each of the multiple partial multiplications. However, the present embodiment is not limited thereto, and a digit unit of the multiplier B may be variously changed in each partial multiplication.

In the embodiment of FIG. 2, the partial multiplication generator 111 may perform a number of (for example, two) partial multiplications. That is, the partial multiplication generator 111 may include multiple partial multiplication calculators that perform a partial multiplication, and for example, may include two partial multiplication calculators for performing two partial multiplications. Therefore, the multiplier B may be supplied to the recoder 120 in units of 4 bits. Moreover, a random signal RS may be supplied to the recoder 120 in units of 2 bits r0 and r1. In signs illustrated in FIG. 2, $b_i$ may correspond to the digit-unit multiplier B. When it is assumed that the partial multiplication generator 111 includes two partial multiplication calculators, the $b_i$ input to the recoder 120 may be represented by 4 bits.

As the security processor 100 performs a booth recoding-based arithmetic operation, the recoder 120 may additionally receive a reference bit bref as a recoder input. Also, the recoder 120 may supply a next reference bit bnext_ref for a next recoding operation. Also, a recoding result may be provided in a control signal form having at least one bits as described above. For example, one recoding result may be output in a control signal form having 4 bits. An example is illustrated to show when the partial multiplication generator 111 performs two partial multiplications and thus control signals having 8 bits are supplied to the calculator 110.

Each of the partial multiplication calculators of the partial multiplication generator 111 may generate a partial multiplication result by performing an arithmetic operation on the multiplicand A and the digit-unit multiplier B. For example, multiple bits of the multiplier B may be classified into multiple groups. When it is assumed that each of the multiple groups includes 2 bits, a sign signal PP0_neg representing a sign of an arithmetic operation result may be generated along with a partial multiplication result PP0 of a partial multiplication on 2 bits of a first group of the multiplier B and the multiplicand A. Also, a sign signal PP2_neg representing a sign of an arithmetic operation result may be generated along with a partial multiplication result PP2 of a partial multiplication on 2 bits of a second group of the multiplier B and the multiplicand A. The arithmetic operation results PP0 and PP2 and the sign signals PP0_neg and PP2_neg may be supplied to the accumulator 112. Also, each of the arithmetic operation results PP0 and PP2 may correspond to n+1 bits, and each of the sign signals PP0_neg and PP2_neg may correspond to 1 bit.

Figure 3:
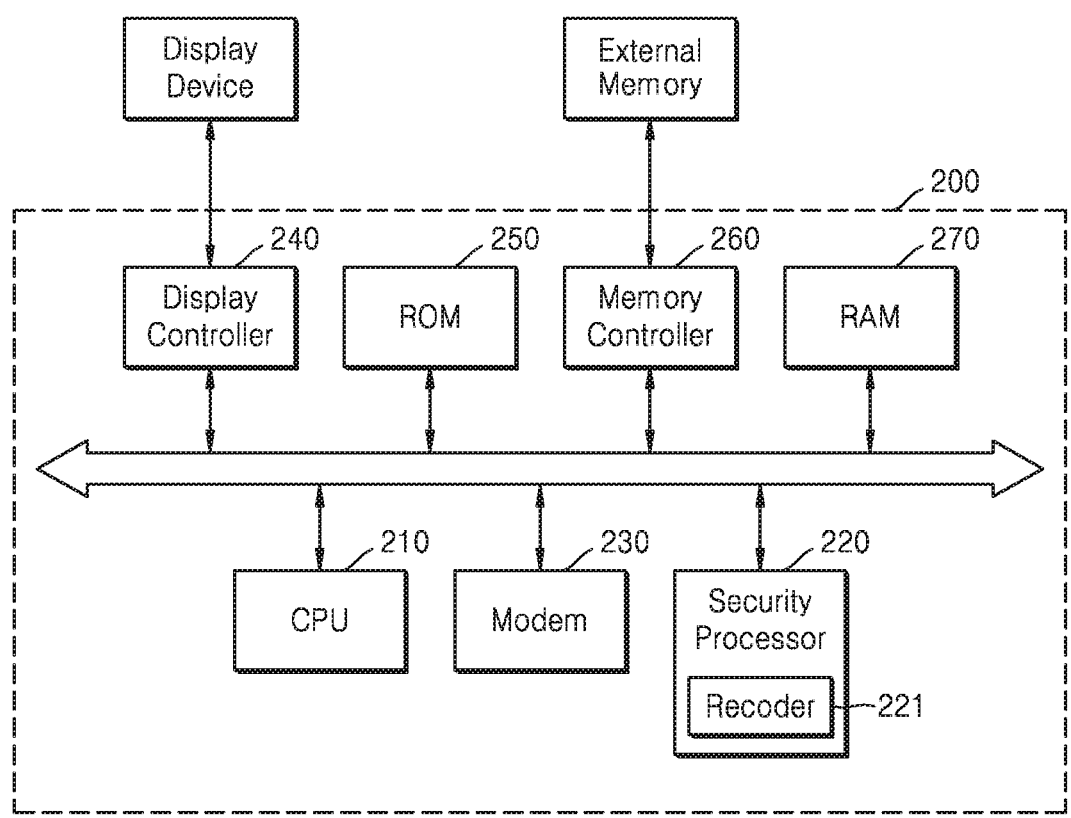
FIG. 3 is a block diagram illustrating an example where a security processor according to an exemplary embodiment is applied to an application processor.

FIG. 3 is a block diagram illustrating an example where a security processor according to an exemplary embodiment is applied to an application processor 200.

Referring to FIG. 3, the application processor 200 may be implemented as a system-on chip (SoC). The application processor 200 may include a central processing unit (CPU), a security processor 220, a modem 230, a display controller 240, read-only memory (ROM) 250, a memory controller 260, and random access memory (RAM) 270. The application processor 200 may further include another element (for example, a power management unit, a graphics processing unit (GPU), and a clock unit) in addition to the illustrated elements.

The CPU 210 may process or execute programs or data stored in the ROM 250 and/or the RAM 270. The ROM 250 may be a non-volatile memory that stores programs and/or data. Also, the RAM 270 may temporarily store programs, data, and instructions. The memory controller 260 may interface with an external memory device and may control the external memory device according to a data access request to write or read data. Also, the display controller 240 may control a display operation of a screen by driving a display apparatus.

According to an embodiment, the security processor 220 may perform a security operation according to the above-described embodiment. For example, the security processor 220 may include a recoder 221. The recoder 221 may convert bits of a multiplier into one of multiple recoding values through a recoding operation to generate a recoding result. For example, if a reference bit and a digit-unit multiplier corresponding to a recoder (221) input have a certain (predetermined) pattern, a random characteristic may be assigned to a recoding result corresponding to the certain pattern. Although not shown in FIG. 3, the security processor 220 may further include a random signal generator and a calculator. The data stored in the ROM 250 or even temporarily stored in the RAM 270 may be encrypted by the security processor 220, with a random characteristic introduced during the recoding operation.

If the modem 230 is included in the application processor 200, the application processor 200 may be referred to as ModAP. Pieces of information requiring a security operation may be transmitted or received to or from an external system. In this case, the security processor 220 may perform the security operation according to the above-described embodiment. The communications may be across wired and/or wireless communications networks, and data communicated (sent or received) in the communications may be encrypted by the security processor 220, with a random characteristic introduced during the recoding operation.

Figure 4:
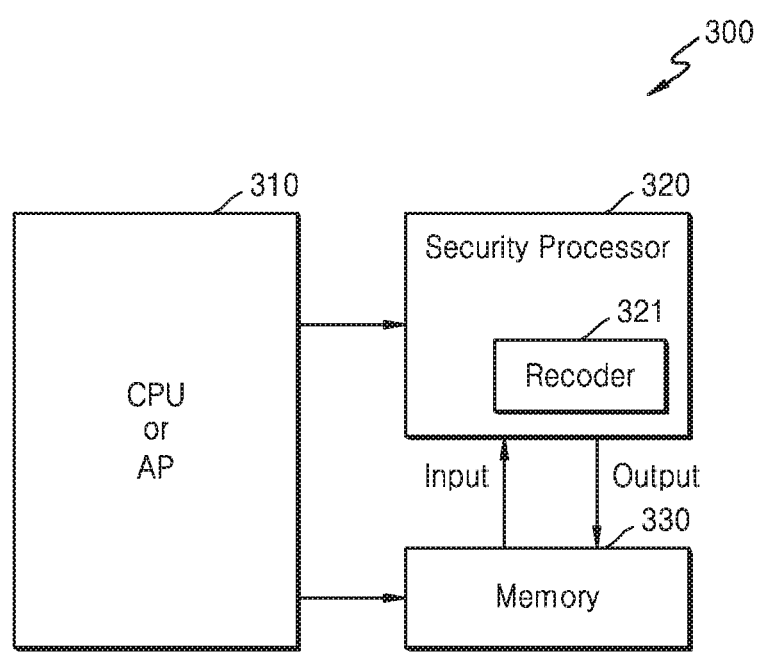
FIG. 4 is a block diagram illustrating an electronic system including a central processing unit (or an application processor) and a security processor.

FIG. 4 is a block diagram illustrating an electronic system 300 including a CPU (or an application processor) 310 and a security processor 320.

The electronic system 300 may further include the security processor 320 for implementing a quick operation processing speed separately from the CPU 310. The security processor 220 may perform a security operation according to the above-described embodiment. The security processor 320 may generate an output by performing a security operation on an input, and the input and the output may be stored in a memory 330 included in the electronic system 300. According to an embodiment, the security processor 320 may be controlled by the CPU 310. Moreover, the security processor 320 may include a recoder 321 that assigns a random characteristic to a recoding result which is as described above. The security processor 320 can encrypt data for communications or storage, with a random characteristic introduced during the recoding operation as described herein.

The electronic system 300 of FIG. 4 may correspond to various kinds of systems. For example, the electronic system 300 may be a system such as a laptop computer, a mobile phone, a smartphone, a tablet personal computer (PC), a personal digital assistant (PDA), or the like. Alternatively, the electronic system 300 of FIG. 4 may be various kinds of systems, such as a security card, for performing a security operation.

Hereinafter, a detailed configuration and operation of the security processor described above in the preceding embodiment will be described.

Figure 5:
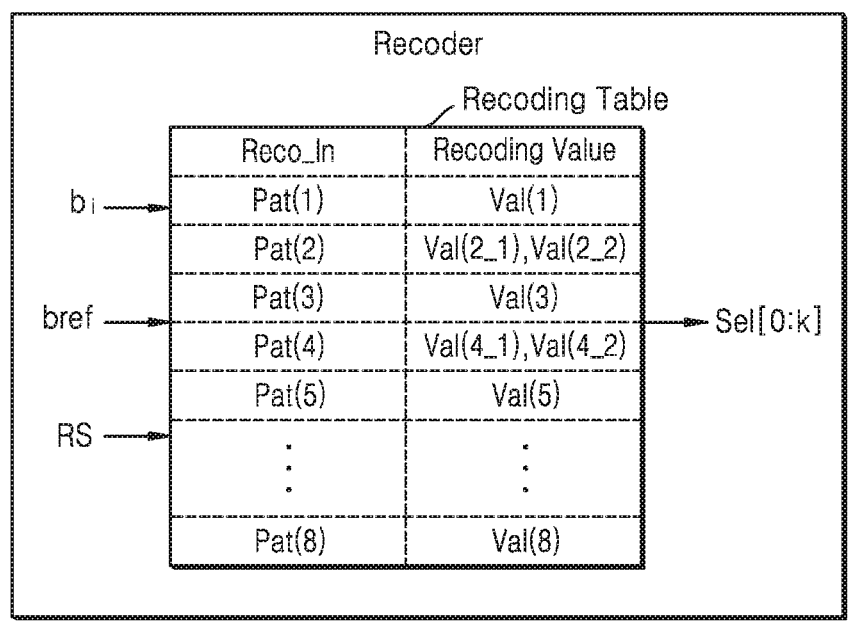
FIG. 5 is a block diagram illustrating an implementation example of a recoding table included in a recoder.

FIG. 5 is a block diagram illustrating an implementation example of a recoding table included in a recoder.

Referring to FIG. 5, a recoder may include a recoding table that stores conversion information about conversion between a recoder input and recoding values. The conversion information may include multiple recoding values respectively corresponding to patterns of multiple recoder inputs. According to the above-described embodiment, a recoder input Reco_In may include a bit $b_i$ of a digit-unit multiplier and a reference bit bref. The recoder input Reco_In may include various patterns, based on the bits $b_i$ and bref. If the bits $b_i$ and bref each include three bits, the recoder input Reco_In may be one of first to eighth patterns Pat(1) to Pat(8).

Based on the conversion information stored in a recoding table, the recoder input Reco_In may be mapped to or converted into a recoding value corresponding thereto. For example, a recoding value Val(1) corresponding to a recoder input Reco_In having the first pattern Pat(1) and a recoding value Val(5) corresponding to a recoder input Reco_In having the fifth pattern Pat(5) may be stored in the conversion information. A recoder input Reco_In to which a random characteristic such as the first pattern Pat(1) is not assigned may be converted into a recoding value having the same value whenever a recoding operation is performed.

According to an embodiment, if a recoder input Reco_In has a certain (predetermined) pattern, a recoding result corresponding to the certain pattern may be randomly changed. For example, if a recoder input Reco_In has the second pattern Pat(2), the recoder input Reco_In may be converted into a recoding result having a first value Val (2_1), or may be converted into a recoding result having a second value Val(2_2). The first value Val(2_1) or the second value Val(2_2) may be selected by a random signal RS. If a bit value of the random signal RS has a random characteristic, a recoding value corresponding to the second pattern Pat(2) may be randomly changed. Also, a recoding result may be generated based on the converting operation and may be output in a control signal sel[0:k] form. For example, if a digit-unit bit $b_i$ of a multiplier B has 2 bits, the control signal sel[0:k] may have a value of 4 bits.

According to an embodiment, if the above-described booth recoding manner is applied, a recoding value may have values "{−2, −1, 0, 1, 2}". Therefore, a recoding value corresponding to a recoder input having one pattern may be the same as a recoding value corresponding to a recoder input having another pattern. Also, a result obtained by multiplying a multiplicand and one of the values "{−2, −1, 0, 1, 2}" (for example, partial multiplication coefficients) may be generated in a partial multiplication, based on the control signal sel[0:k]. Therefore, in a partial multiplication, a partial multiplication generator may receive a multiplicand A and the control signal sel[0:k] as inputs and may generate one of values "{−2A, −A, 0, A, 2A}" through a partial multiplication process.

FIG. 6 is a table showing an example of numerical values included in a recoding table included in a recoder. A feature of a recoding table shown in FIG. 6 will be described below in association with the following Equation.

For example, if a multiplier B has $01101001_{(2)}$ as a value of 8 bits, the multiplier B may be converted such that coefficients of the multiplier B may have values "{−2, −1, 0, 1, 2}" as in the following Equation (1). For example, the multiplier B may be converted into "$2 \cdot 2^6 - 1 \cdot 2^4 - 2 \cdot 2^2 + 1 \cdot 2^0$" as in (1) of the following Equation (1), or may be converted into "$1 \cdot 2^6 + 2 \cdot 2^4 + 2 \cdot 2^2 + 1 \cdot 2^0$" as in (2) of the following Equation (1). That is, values obtained through the conversion may all have a value "105" identically to $01101001_{(2)}$ of the multiplier B, and the multiplier B may be converted in various manners in addition to values represented in the following Equation (1):

$$\begin{aligned}
B &= 01101001_{(2)} \\
&= 0 \cdot 2^7 + 1 \cdot 2^6 + 1 \cdot 2^5 + 0 \cdot 2^4 + 1 \cdot 2^3 + 0 \cdot 2^2 + 0 \cdot 2^1 + 1 \cdot 2^0 \\
&= 2 \cdot 2^6 - 1 \cdot 2^4 - 2 \cdot 2^2 + 1 \cdot 2^0 \quad (1) \\
&= 1 \cdot 2^6 + 2 \cdot 2^4 + 2 \cdot 2^2 + 1 \cdot 2^0 \quad (2)
\end{aligned}$$

According to the conversion example, 2 bits corresponding to a digit unit of the multiplier B may be converted into one of values "{−2, −1, 0, 1, 2}". For example, an 8-bit multiplier B may be classified into four groups each having 2 bits, and for example, two least significant bits may be classified into a first group, two second-significant bits may be classified as a second group, two third-significant bits may be classified as a third group, and two most significant bits may be classified as a fourth group.

Moreover, when it is assumed that a recoding operation is first performed from lower significant bits of the multiplier B, an upper significant bit of a group where a current recoding operation is performed may be used as a reference bit in a next recoding operation. For example, when a recoding operation is performed on the second group, an upper significant bit of two bits of the first group may correspond to a reference bit "Ref bit". For example, when a recoding operation is performed on the first group including the two least significant bits, a bit corresponding to 0 may be defined as the reference bit "Ref bit". Therefore, when it is assumed that two bits on which a current recoding operation is performed are $b_{2i+1}$ and $b_{2i}$, the reference bit "Ref bit" may correspond to $b_{2i-1}$ in the current recoding operation, and a reference bit "Next Ref bit" may correspond to $b'_{2i-1}$ in a next recoding operation.

A recoding operation based on the table of FIG. 6 will be described below.

First, in association with the multiplier B described in Equation (1), the first group including the two least significant bits may be 01, and the reference bit "Ref bit" may correspond to 0. Therefore, as in the table of FIG. 6, a recoder input including the bits of the first group and the reference bit "Ref bit" may correspond to 010, and a recoding value corresponding thereto may be a value "1". Also, the second group including the two second-significant bits may be 10, and the reference bit "Ref bit" may correspond to 0 as the upper significant bit of the first group.

Accordingly, a recoder input including the bits of the second group and the reference bit "Ref bit" may correspond to 100.

In this case, the bits of the second group and the reference bit "Ref bit" may have a predefined certain pattern 100, and a random characteristic may be applied to a recoding result corresponding thereto. For example, if a recoder input corresponds to 100, a recoding value corresponding thereto may have a value "2" or "−2". A random bit may be used for assigning the random characteristic to the recoding result. For example, if a random bit is 0, a recoding value corresponding to a recoder input "100" may have a value "2", and if the random bit is 1, the recoding value corresponding to the recoder input "100" may have a value "−2".

Moreover, as in the table of FIG. 6, the random characteristic may be further assigned to a recoder input having at least one other pattern. For example, if a recoder input corresponds to 011, a recoding value corresponding thereto may have a value "2" or "−2". In this case, if a random bit is 0, a recoding value corresponding to a recoder input "011" may have a value "−2", and if the random bit is 1, the recoding value corresponding to the recoder input "011" may have a value "2". Furthermore, in a recoding operation on patterns to which the random characteristic is not assigned, the random bit may be "don't care", which may be taken to mean that the value or meaning of the random bit is not specified at all or is not completely specified.

As the random characteristic is assigned to a recoding result of a recoding operation on the same recoder input, a difference occurs in a partial multiplication result using the recoding result. For example, according to a conversion result in Equation (1), if a recoder input is 100, the recoder input is converted into a recoding value having a value "−2". However, according to an embodiment, if the recoder input is 100, the recoder input may be converted into a recoding value having a value "2". That is, when the recoder input corresponding to 100 is converted into the recoding value having the value "2", a corresponding partial multiplication result value may be changed, and compensation for the change in the partial multiplication result value may be reflected in at least one next partial multiplications (or a next group).

For example, the compensation may be reflected in a partial multiplication subsequent to a partial multiplication where a recoding result occurs randomly. The compensation may be performed by changing a value of a reference bit which is used in a next partial multiplication. For example, when a recoder input corresponding to 011 is converted into a recoding value having a value "2", a separate compensation process is not needed. Thus, a value of an upper significant bit (for example, 0) of the second group which is a current group may be used as a reference bit in association with a recoding operation of the third group which is a next group. On the other hand, when the recoder input corresponding to 011 is converted into a recoding value having a value "−2", a value obtained by inverting an upper significant bit (for example, 0) of the second group for the above-described compensation may be used as the reference bit in association with the recoding operation of the third group which is the next group.

In the above-described embodiment, an example where the recoding table is previously created and is stored in the security processor has been described above, but the present embodiment is not limited thereto. For example, the recoding value corresponding to the recoder input shown in the table may be calculated by executing a certain (predetermined) equation. Also, an element for executing the certain equation may be included in the security processor. Thus, a recoding value may be generated through an arithmetic operation.

FIG. 7 is a table showing an example of a control signal generated based on a recoding result according to an embodiment.

Referring to FIGS. 6 and 7, if a recoding value listed in the table of FIG. 6 corresponds to −2, control signals sel0 to sel3 may have a value "1010" in correspondence with the recoding value, and if the recoding value corresponds to −1, the control signals sel0 to sel3 may have a value "1001" in correspondence with the recoding value. Also, if the recoding value corresponds to 0, the control signals sel0 to sel3 may have a value "0000" in correspondence with the recoding value, and if the recoding value corresponds to 1, the control signals sel0 to sel3 may have a value "0101" in correspondence with the recoding value. Also, if the recoding value corresponds to 2, the control signals sel0 to sel3 may have a value "0110" in correspondence with the recoding value. The control signals sel0 to sel3 may each be used as a signal for selecting a coefficient which is multiplied to a multiplicand in a below-described partial multiplication.

Figure 8:
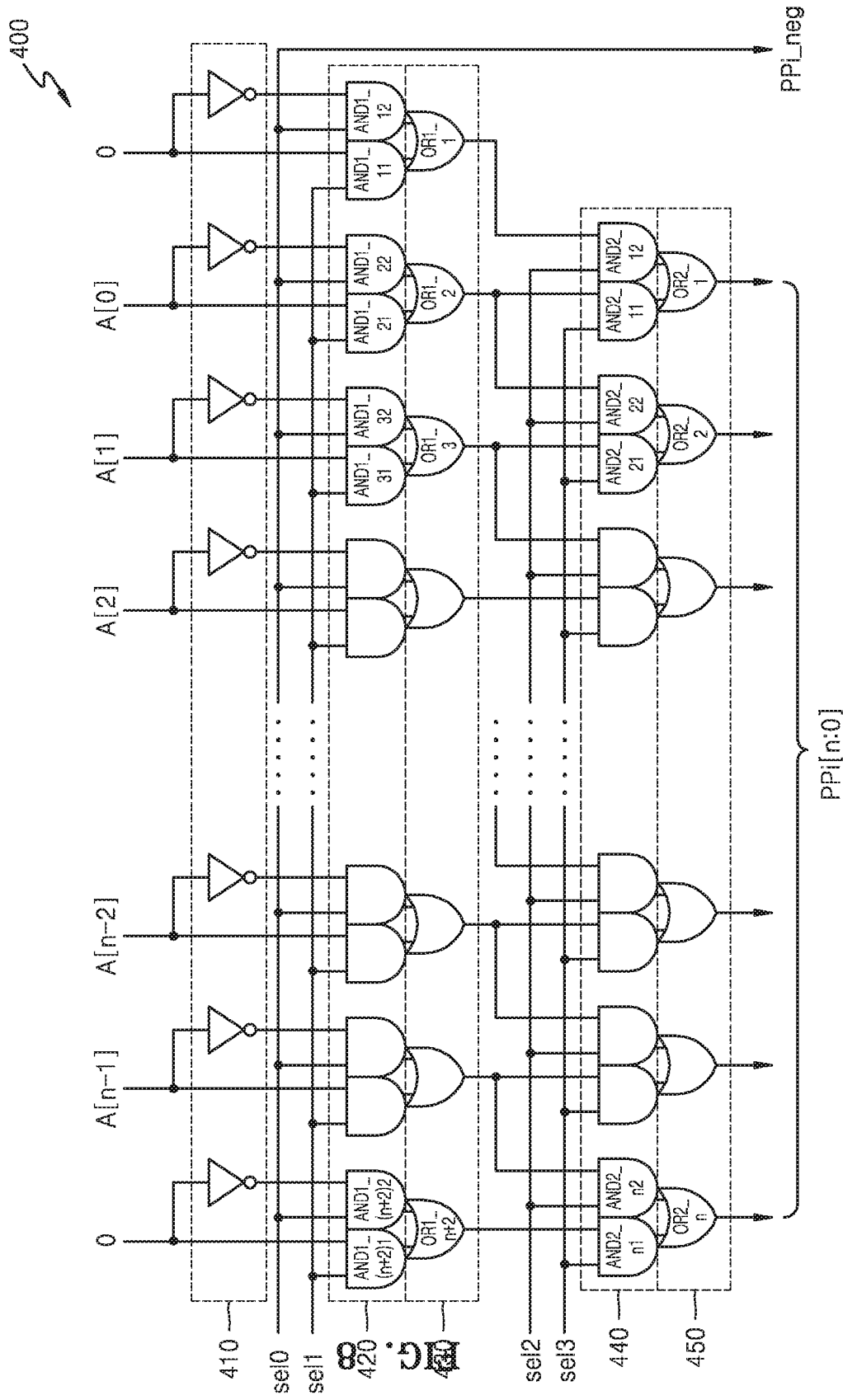
FIG. 8 is a circuit diagram illustrating an implementation example of a partial multiplication calculator applied to a security processor according to an embodiment.

FIG. 8 is a circuit diagram illustrating an implementation example of a partial multiplication calculator applied to a security processor according to an embodiment.

Referring to FIG. 8, a multiplicand A[0 to n−1] of n bits and the control signals sel0 to sel3 based on a digit-unit recoding result may be supplied to a partial multiplication calculator 400. In FIG. 8, logic elements configuring the partial multiplication calculator 400 are illustrated, but since the security processor includes two or more partial multiplication calculators as described above, two or more partial multiplications may be simultaneously performed. The partial multiplication calculator 400 may generate a partial multiplication PPi[n:0] of n+1 bits and sign data PPi_neg of 1 bit as a result obtained by multiplying the multiplicand A[0 to n−1] of n bits and a multiplier of 2 bits. If a multiplicand is A, a partial multiplication result value may be one of −2A, −A, 0, A, and 2A, based on the partial multiplication PPi[n:0] of n+1 bits and the sign data PPi_neg of 1 bit. The sign data PPi_neg of 1 bit may correspond to a first control signal sel0.

The partial multiplication calculator 400 may be implemented with multiple logic elements, and in FIG. 8, for example, the partial multiplication calculator 400 is illustrated as including multiple inverters 410, multiple AND gates, and multiple OR gates. For example, as an input of the partial multiplication calculator 400, a value "0" may be further input to a right side of a least significant bit A[0] of the multiplicand A[0 to n−1] in addition to the multiplicand A[0 to n−1] of n bits, and moreover, a value "0" may be further input to a left side of a most significant bit A[n−1] of the multiplicand A[0 to n−1].

The partial multiplication calculator 400 may include n+2 number of inverters 410, based on the multiplicand A[0 to n−1] and two values "0". Also, the partial multiplication calculator 400 may further include a first-end AND gate block 420 and a first-end OR gate block 430. The first-end AND gate block 420 may include multiple AND gates AND1_11, AND1_12 to AND1_(n+2)1, and AND1($n$+2)2, and for example, two AND gates may be provided based on a bit of each of the multiplicand A[0 to n−1] and two values "0". To describe the least significant bit A[0] of the multiplicand A[0 to n−1] for example, a first AND gate AND1_21 may receive a second selection signal sel1 and the least significant bit A[0] as an input, and a second AND gate AND1_22 may receive a first selection signal sel0 and an inverted value of the least significant bit A[0] as an input. Also, a first-end OR gate block 430 may include multiple OR gates OR1_1 to OR1_(n+2). To describe the least significant bit A[0] of the multiplicand A[0 to n−1] for example, outputs of the first AND gate AND1_21 and the second AND gate AND1_22 may be provided as an input of a second OR gate OR1_2.

Moreover, the partial multiplication calculator 400 may further include a second-end AND gate block 440 and a second-end OR gate block 450. For example, the second-end AND gate block 440 may include multiple AND gates AND2_11, AND2_12 to AND2_n1. To describe two lower significant bits A[0] and A[1] of the multiplicand A[0 to n−1] for example, a first AND gate AND2_21 may receive a fourth selection signal sel3 and an output of a third OR gate OR1_3 of the first-end OR gate block 430, and a second AND gate AND2_22 may receive a third selection signal sel2 and an output of a second OR gate OR1_2 of the first-end OR gate block 430.

The second-end OR gate block 450 may include multiple OR gates OR2_1 to OR2_n. To describe the two lower significant bits A[0] and A[1] of the multiplicand A[0 to n−1] for example, outputs of the first AND gate AND2_21 and the second AND gate AND2_22 may be provided as an input of a second OR gate OR2_2. In addition, a detailed connection relationship of other logic elements included in the partial multiplication calculator 400 may be implemented as illustrated in the drawing, and its detailed description is omitted.

In the logic elements illustrated in FIG. 8, the above-described recoding result may be reflected in a partial multiplication according to the control signals sel0 to sel3. For example, first and second control signals sel0 and sel1 may determine a negative/positive sign of the multiplicand A, and third and fourth control signals sel2 and sel3 may determine a coefficient of a partial multiplication as corresponding to 1 or 2. For example, if a partial multiplication result is a negative number, the sign data PPi_neg may be used for generating 2's complement, and for example, −2A may be expressed as "−2A=~(A<<1)+1". In the equation, A<<1 may correspond to "×2", and negation "~" and "+1" is for generating 2's complement.

According to an arithmetic operation result by the partial multiplication calculator 400 according to an embodiment, even though a digit-unit multiplier input to a recoder has the same bit value, the first to fourth control signals sel0 to sel3 may be randomly changed when a recoder input has a certain (predetermined) pattern. Also, even when the same multiplicand is multiplied to the same digit-unit multiplier, a partial multiplication result may be randomly changed whenever a partial multiplication is performed. Also, according to an embodiment, a pattern of total power consumption of a calculator may be effectively and randomly generated. Thus, the partial multiplication calculator 400 may have a characteristic robust to an SCA based on a power analysis attack. Also, in implementing a countermeasure, additional hardware is minimized, and moreover, security performance is reinforced without an excessive increase in average consumption power.

FIG. 9 is a diagram illustrating an example where recoding values are randomly changed with respect to the same multiplier, based on the table of FIG. 6.

For example, a multiplier B may include 32 bits corresponding to 11110010 00000101 10101111 01101010. If the random characteristic according to an embodiment is not applied, as illustrated in FIG. 9 (*a*), a recoding value "2" may be generated based on a recoder input "011", and a recoding value "−2" may be generated based on a recoder input "100". Therefore, a recoding value corresponding to the multiplier B may correspond to 0 −1 1 −2 0 0 1 2 −1 −1 0 −1 2 −1 −1 −2.

On the other hand, if the random characteristic according to an embodiment is applied, the recoding value corresponding to the multiplier B may be generated. That is, a random signal input to a recoder may have a random bit. Thus, the recoding value corresponding to the multiplier B may be randomly changed based on the random bit. For example, a recoding value "0 −1 1 −2 0 0 1 2 −1 −1 0 −1 2 −1 −2 2" is illustrated in FIG. 9 (*b*), a recoding value "0 −1 1 −2 0 0 1 2 −1 −1 0 0 −2 −1 −1 −2" is illustrated in FIG. 9 (*c*), and a recoding value "0 −1 0 0 0 2 −2 −1 −1 0 0 −2 −1 −2 2" is illustrated in FIG. 9 (*d*).

An analysis of the recoding result will be described below.

According to an embodiment, as a recoding result, 2 may be randomly changed to −2, and moreover, −2 may be randomly changed to 2. In this case, if the random characteristic is not applied, values "−1" and "−2" corresponding to α may correspond to values obtained by converting four lower significant bits "1010" of a multiplicand, and the values "−1" and "−2" may respectively be a coefficient of $2^2$ and a coefficient of $2^0$.

Moreover, values "−2" and "−2" corresponding to β may be values obtained by converting the four lower significant bits "1010" of the multiplicand, and unlike α, two least significant bits of the multiplicand may be converted to a value "2". In this case, since the coefficient of $2^0$ has increased by four unlike α, a difference between values may be compensated for. In this case, according to the above-described embodiment, a value of a reference bit used for a next recoding operation may be changed. Thus, two next lower significant bits "10" of the multiplicand may be converted to −2. That is, the two next lower significant bits "10" of the multiplicand may be converted to a value which is obtained by decreasing, by −1, the recoding value "−1" corresponding to α. Accordingly, since the coefficient of $2^0$ has increased by four but the coefficient of $2^2$ has decreased by one, a value in FIG. 9 (*a*) and a value in FIG. 9 (*b*) may have the same value.

Such a manner may be identically applied to FIGS. 9 (*c*) and (*d*), and an example where the random characteristic is applied multiple times in a recoding process on the multiplier B is illustrated in FIG. 9 (*d*). That is, referring to FIG. 9 (*d*), when a value "2" in FIG. 9 (*a*) is changed to −2, a recoding value may increase by one in a next recoding operation, but when a value "−2" in FIG. 9 (*a*) is changed to 2, a recoding value may decrease by one in a next recoding operation.

Figure 10:
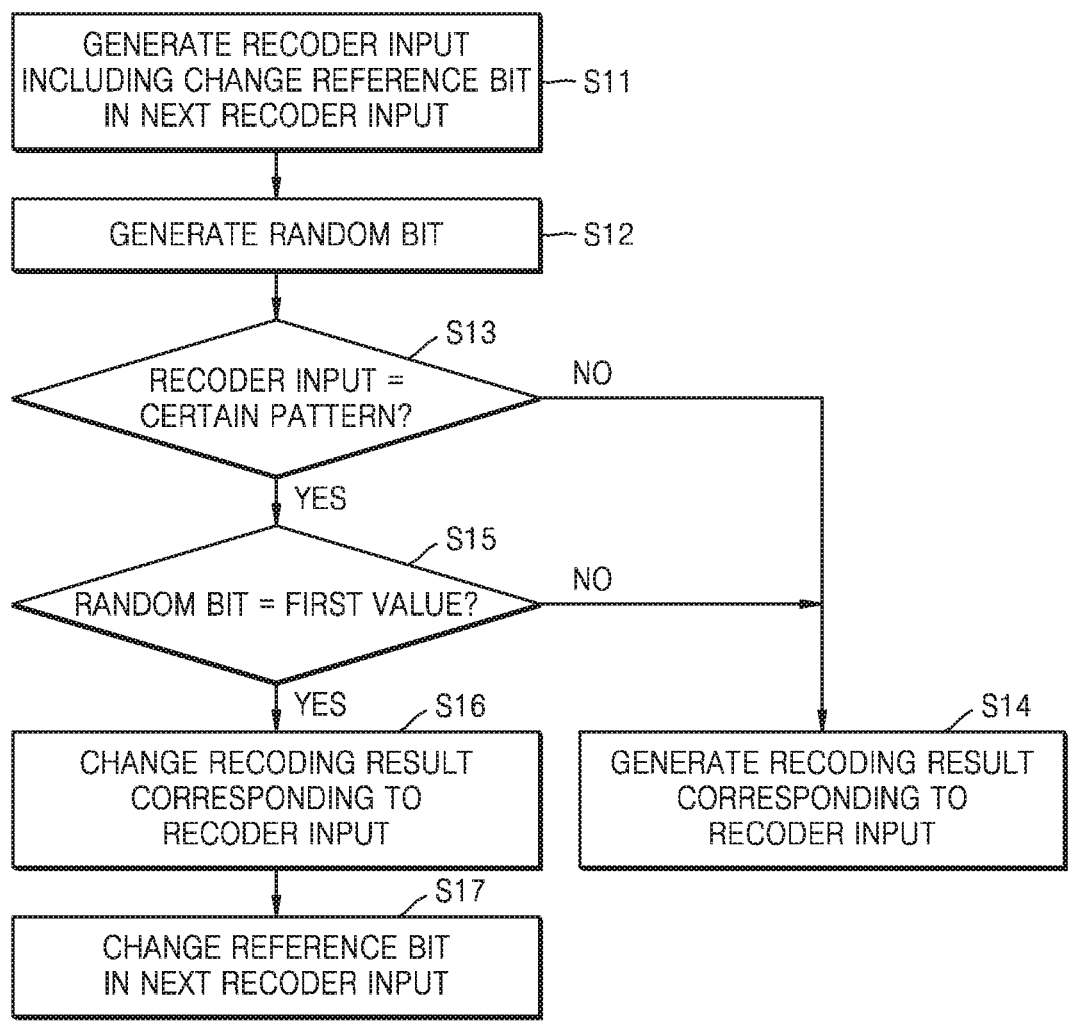
FIGS. 10 and 11 are flowcharts illustrating an operating method of a security processor according to an embodiment.
Figure 11:
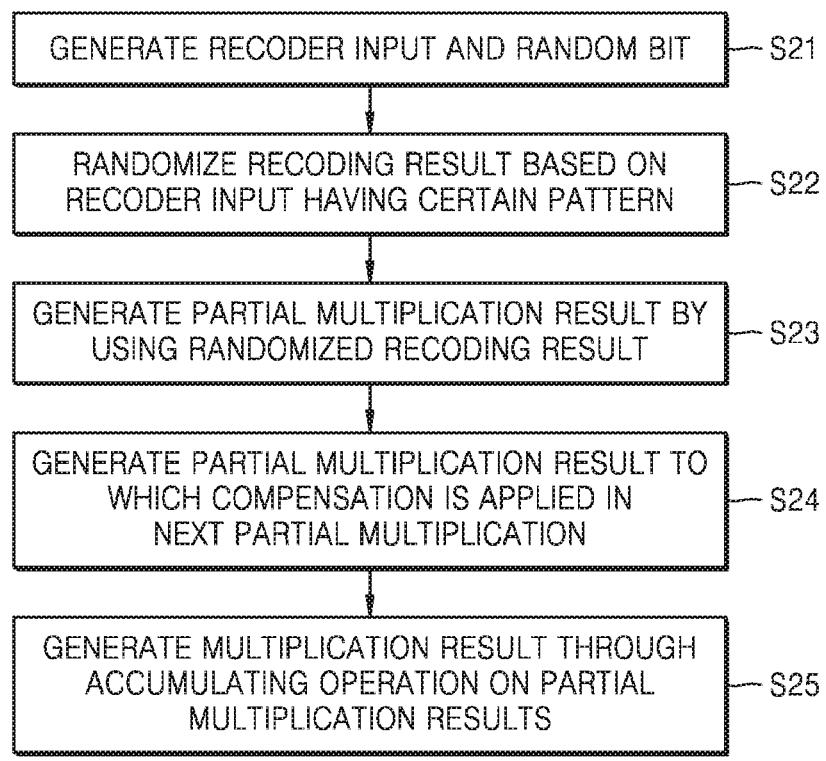

FIGS. 10 and 11 are flowcharts illustrating an operating method of a security processor according to an embodiment.

Referring to FIG. 10, in performing a multiplication on a multiplier and a multiplicand, a recoding operation on the multiplicand may be performed in units of a certain (predetermined) number of bits (for example, by a digit unit), and for example, the recoding operation may be performed in units of two bits. A recoder input including a reference bit and a multiplier of 2 bits may be generated in operation S11. As in the above-described embodiment, the reference bit may correspond to an upper significant bit of the multiplier of 2 bits input to a previous recoding operation. Also, if a recoder input has a certain (predetermined) pattern, a random bit may be generated for assigning the random characteristic to a recoding result corresponding to the certain pattern in operation S12.

Moreover, the recoding operation may be performed. In a recoding process, an operation S13 may determine whether the recoder input including the reference bit and the multiplier of 2 bits has (is equal to) the certain (predetermined) pattern of the multiple predetermined patterns. If the recoder input does not have the certain pattern, the same recoding result may be always generated based on the recoder input in operation S14, and a partial multiplication may be performed based on the generated recoding result. On the other hand, if the recoder input has the certain pattern, a random bit may be checked for assigning the random characteristic according to the certain pattern, and for example, whether the random bit has a first value may be determined in operation S15.

For example, if the random bit does not have the first value, a recoding result (for example, a first recoding result) may be generated based on the recoder input having the certain pattern in operation S14. A partial multiplication result based on the first recoding result may correspond to an arithmetic operation result which is not compensated for in a next partial multiplication.

On the other hand, if the random bit has the first value, a recoding result (for example, a second recoding result) may be generated based on the recoder input having the certain pattern in operation S16. A partial multiplication result based on the second recoding result may correspond to an arithmetic operation result which is to be compensated for in a next partial multiplication. Therefore, a reference bit supplied to a recoder may be changed in a next recoder input in operation S17, and for example, if an upper significant bit of a multiplier of a current recoder input corresponds to 1, a reference bit input to a next recoder may be changed to 0.

Referring to FIG. 11, a random bit and a recoder input including some bits of a multiplier and a reference bit may be generated in operation S21. The recoder input may include multiple patterns, and for example, if the recoder input corresponds to 3 bits, the recoder input may correspond to one of eight patterns. A certain pattern of the eight patterns may be previously set, and a recoding result corresponding to a recoder input having the certain pattern may be randomized in operation S22.

Moreover, a partial multiplication may be performed by using the randomized recoding result. Thus, a partial multiplication result may be generated in operation S23. For example, based on the randomized recoding result, first and second partial multiplication results may be randomly generated based on a recoder input having the same certain pattern. The first partial multiplication result may cause generation of an arithmetic operation result which is not compensated for in a subsequent partial multiplication, and the second partial multiplication result may cause generation of an arithmetic operation result which is to be compensated for in a next partial multiplication. For example, if the partial multiplication result generated in operation S23 is to be compensated for in a next partial multiplication, a partial multiplication result to which compensation is applied may be generated in the next partial multiplication in operation S24, and for example, as described above, the compensation may be applied by changing a value of a reference bit used for the next partial multiplication. Also, n number of partial multiplication results may be generated by dividing the multiplier into multiple (for example, n) groups, and a final multiplication result (a multiplication result of a multiplication on the multiplier and the multiplicand) may be generated by performing an accumulating operation on the partial multiplication results in operation S25.

Figure 12A:
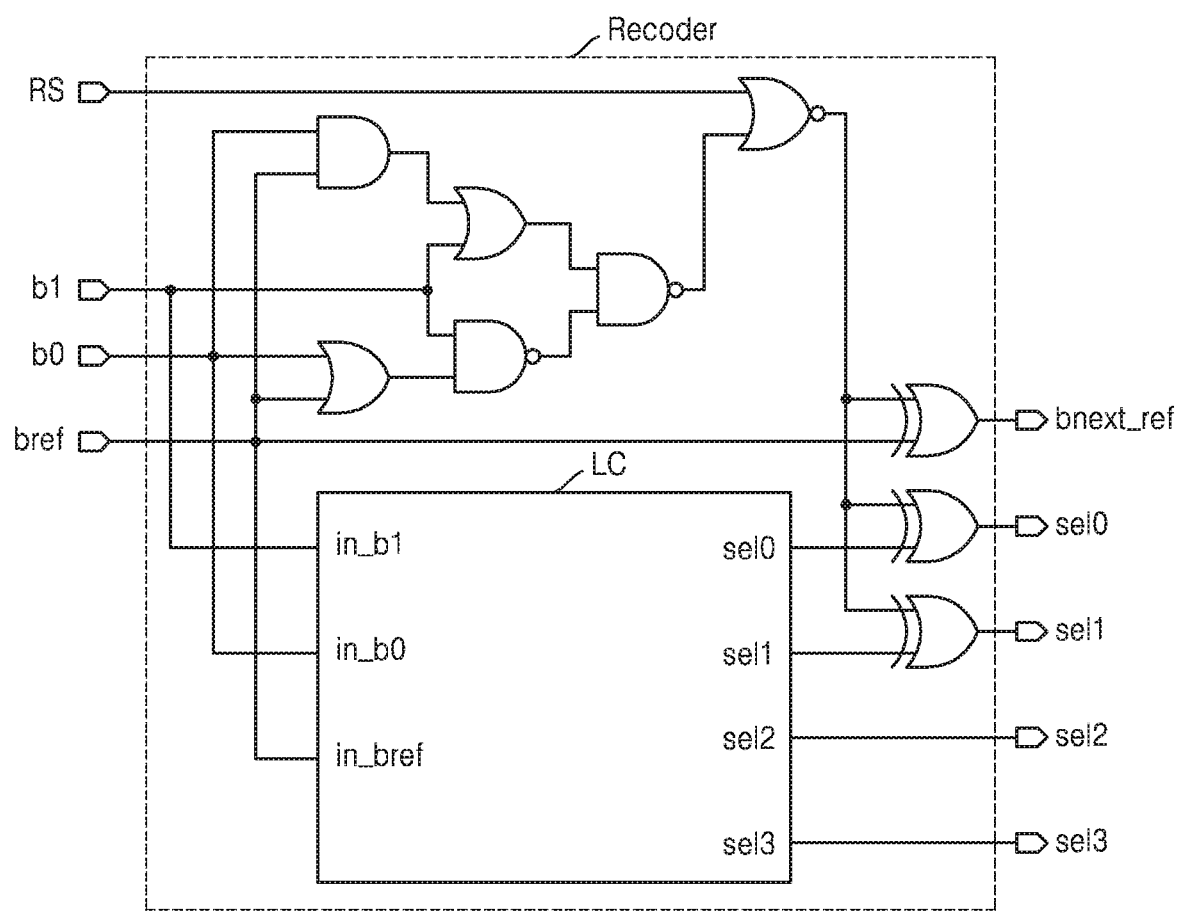
FIGS. 12A and 12B are circuit diagrams illustrating an implementation example of a recoder according to an embodiment.
Figure 12B:
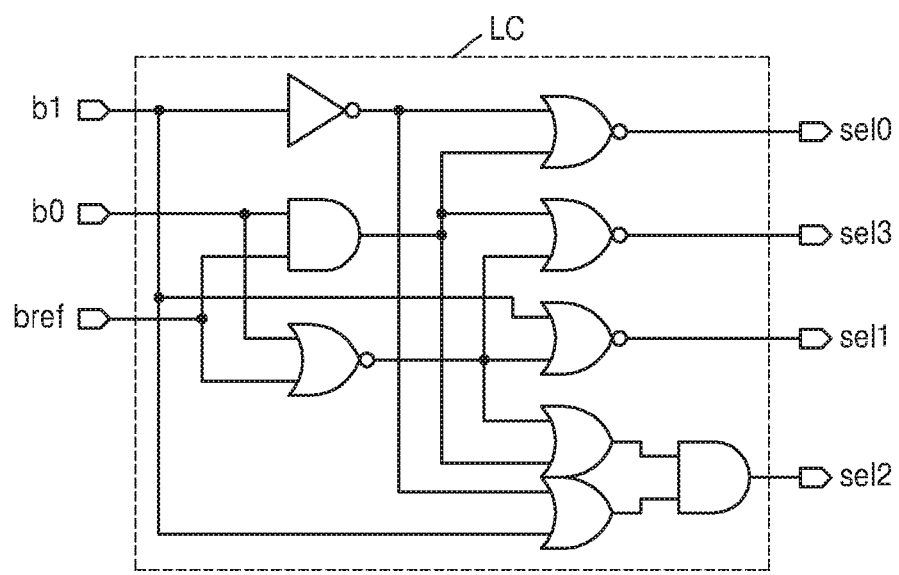

FIGS. 12A and 12B are circuit diagrams illustrating an implementation example of a recoder according to an embodiment.

Referring to FIG. 12A, a recoder applied to an embodiment may include a logic circuit LC and multiple gates. For example, the recoder may include a plurality gates, for example, at least one AND gates, OR gates, NAND gates, NOR gates, and exclusive OR gates. The recoder may receive at least one bits b0 and b1 of a multiplier and a reference bit bref, and moreover, according to the above-described embodiment, a random signal RS for assigning the random characteristic to a recoding result may be supplied to the recoder. Also, the recoder may output control signals sel0 to sel3 corresponding to the recoding result, and moreover, a reference bit bnext_ref used for a next recoding operation may be output.

Gates illustrated in FIG. 12B correspond to an example where the logic circuit LC illustrated in FIG. 12A is implemented. The logic circuit LC illustrated in FIG. 12A may receive at least one bits b0 and b1 and a reference bit bref through input terminals in_b1, in_b0, and in_bref. The logic circuit LC illustrated in FIG. 12A may perform a recoding operation to which the random characteristic according to an embodiment is not assigned, and for example, a recoding result corresponding to a recoder input may be generated identically to values which are not hatched in the table of FIG. 6.

Referring again to FIG. 12A, by using the logic circuit LC and the multiple gates, the recoder may perform a recoding operation to which the random characteristic shown in the table of FIG. 6 is assigned. As described above, third and fourth control signals sel2 and sel3 may be signals for determining a coefficient of a partial multiplication as 1 or a multiple of 2, and the third and fourth control signals sel2 and sel3 from the logic circuit LC may be output as third and fourth control signals sel2 and sel3 of the recoder without a separate converting process.

On the other hand, first and second control signals sel0 and sel1 may be used to determine a sign of a coefficient, and when a recoding value is changed to −2 or 2 according to an embodiment, a sign of a recoding value by the logic circuit LC may change by logic gates of the recoder of FIG. 12A. For example, if recoder inputs b0, b1, and bref correspond to a certain (predetermined) pattern, values of the first and second control signals sel0 and sel1 from the recoder may be changed by a random signal RS. Also, a compensation process responding to a change in the recoding result may be performed. Thus, a value of a next reference bit bnext_ref may be changed based on the random signal RS.

The recoder and the logic circuit LC illustrated in FIGS. 12A and 12B are merely an implementation example, and the recoder according to embodiments may be implemented in various methods in order for the same recoding result to be generated.

FIG. 13 is a table showing another example of numerical values included in a recoding table included in a recoder.

Referring to FIG. 13, in assigning the random characteristic, a recoding value may be changed to various numerical values. For example, an example where a recoding value is changed to a value "−2" or "2" is illustrated in FIG. 6, but an example where a recoding value is variously changed to −4, −3, −2, 2, 3, and 4 is illustrated in FIG. 13. Also, an example where the random characteristic is assigned to two predetermined patterns of multiple patterns of a recoder input is illustrated in FIG. 6. An example where the random characteristic is assigned to a higher number of patterns (for example, all possible patterns) is illustrated in FIG. 13. A random bit is not limited to values "0" and "1", and in one recoding process, the random bit may include two or more bits. Also, as illustrated in FIG. 13, a random bit for selecting a recoding result based on a recoder input having one pattern may have one value (for example, a) or a complement value (for example, !a) thereof.

For example, values which are not hatched in the table of FIG. 13 may correspond to a recoding value to which the random characteristic is not applied. On the other hand, if the random characteristic according to an embodiment is applied, a recoder input corresponding to 000 may be converted to a recoding value having a value "0" or "−4", based on a random bit (a value of a or !a). Similarly, a recoder input corresponding to 001 may be converted to a recoding value having a value "1" or "−3", and moreover, a random decoding result shown in the table of FIG. 13 may be generated based on the other patterns.

Moreover, if a pattern of a recoder input corresponds to 000, 001, 010, and 011, a recoding value may further decrease by four when the random characteristic is applied, compared to when the random characteristic is not applied. Therefore, in order for the decrease to be compensated for in a next partial multiplication, a next reference bit (an upper significant bit of a current digit unit) may be changed from 0 to 1. Alternatively, if a pattern of a recoder input corresponds to 100, 101, 110, and 111, a recoding value may further increase by four when the random characteristic is applied, compared to when the random characteristic is not applied. Therefore, in order for the increase to be compensated for in a next partial multiplication, a next reference bit (an upper significant bit of a current digit unit) may be changed from 1 to 0.

As described above, according to embodiments, the random characteristic may be assigned to a recoding result according to various manners, based on a recoder input having various patterns. That is, the present embodiments are not limited to the numerical values of the tables shown in FIGS. 6 and 13, and numerical values may be variously changed within the scope which is the same as or similar to assignment of the random characteristic according to the present embodiments.

Figure 14:
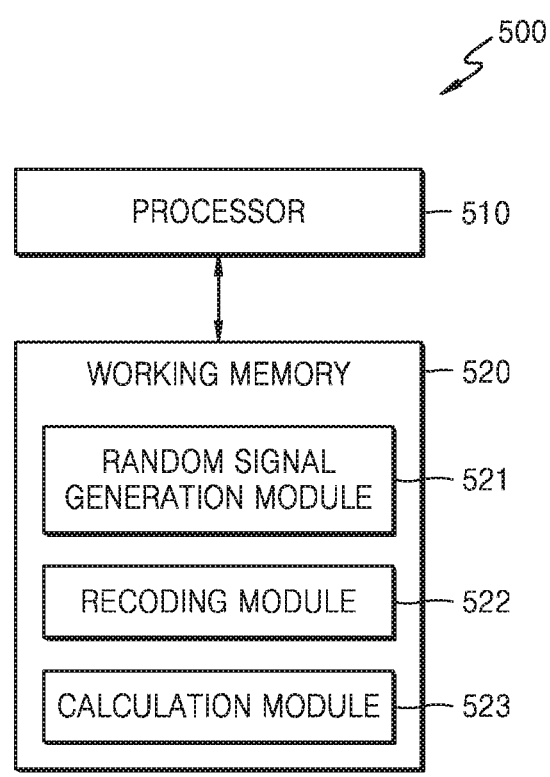
FIG. 14 is a block diagram illustrating an example where a function of the security processor of FIG. 1 is implemented with software.

FIG. 14 is a block diagram illustrating an example where a function of the security processor of FIG. 1 is implemented with software.

The above-described various functions of the security processor may be performed in hardware, or by executing a program, the various functions may be performed in software. Alternatively, the various functions of the security processor may be implemented as a combination type of hardware and software.

Referring to FIG. 14, a security processor 500 may include a processor 510 for executing a program and a working memory 520 that stores a program for realizing various functions associated with the security operation. The working memory 520 may be a computer-readable storage medium and may be implemented with various kinds of storage mediums such as a non-volatile memory including RAM and flash memory, ROM, electrically erasable programmable read only memory (EEPROM), magnetic disk storage device, etc.

The program stored in the working memory 520 may be classified into multiple modules depending on a function thereof. For example, the working memory 520 may include a random signal generation module 521, a recoding module 522, and a calculation module 523.

The processor 510 may execute the random signal generation module 521. Thus, a random signal for assigning the random characteristic may be generated in a recoding process of each of partial multiplications. Also, the processor 510 may execute the recoding module 522, and for example, a recoding result having the random characteristic shown in the above-described table may be generated. Also, the processor 510 may include the calculation module 523. Therefore, a partial multiplication in which the random characteristic is reflected may be performed, and simultaneously, a multiplication result of a multiplication on a multiplier and a multiplicand may be generated by performing an accumulating operation on multiple partial multiplication results.

Figure 16:
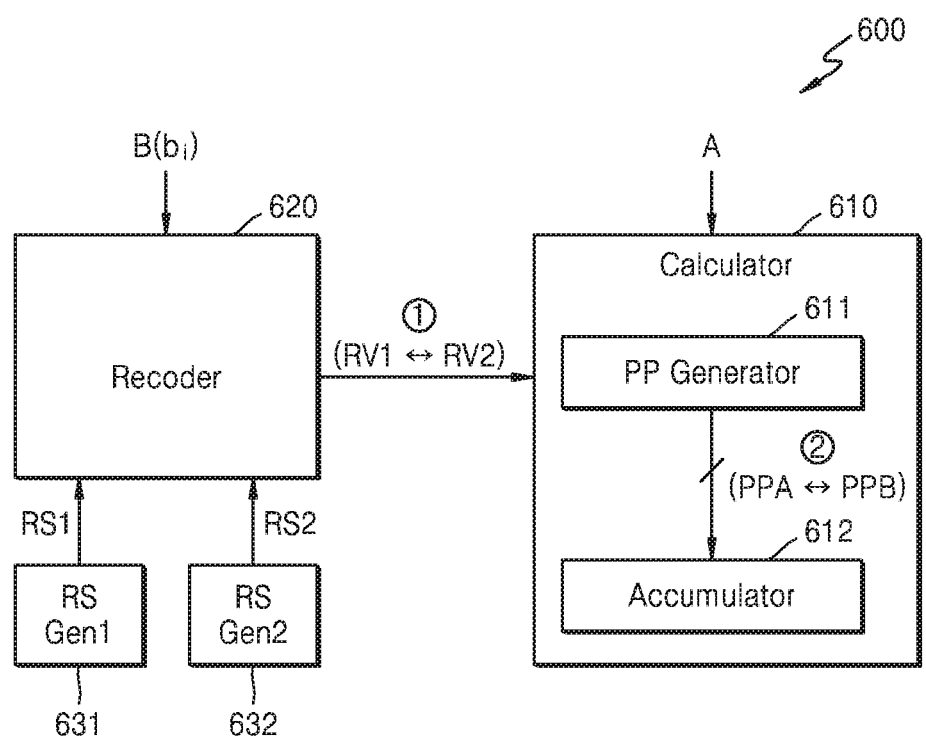

FIGS. 15 and 16 are diagrams illustrating an example of a recoding operation and a partial multiplication according to another embodiment. In FIGS. 15 and 16, by applying the random characteristic to a partial multiplication having a certain (predetermined) pattern (for example, a11 0), power consumption is effectively randomized, and an SCA is effectively defended. Also, a detailed implementation example of a security processor for realizing an operation described in the embodiment of FIGS. 15 and 16 may be implemented identically or similarly to the security processor described in the above-described embodiments, and thus, its detailed description is omitted.

In generating a partial multiplication result of a partial multiplication on a multiplicand and a digit-unit multiplier, if the digit-unit multiplier corresponds to 0, the partial multiplication result may be 0. In this case, referring to the above-described algorithm 1 and algorithm 2, a process of calculating actual power consumption by the algorithms 1 and 2 may correspond to "$T \leftarrow T+b_i*A$". However, if $b_i$ corresponds to 0, a value of a variable "T" is not changed. Thus, power consumption is lower than average power consumption. Also, if $b_i$ continuously corresponds to 0 twice or more, a value of T is not changed, and moreover, a switching activity of a logic gate for calculating "$b_i*A$" is rapidly reduced, whereby power consumption is rapidly reduced. If a change in power consumption does not occur or is small, there is a possibility that a $b_i$ value is leaked, and this is an important drawback of the security processor.

A partial multiplication result corresponding to 0 may be expressed as the following Equation (2). That is, 0 may be a sum of 1 and −1, and if −1 is represented by 2's complement, −1 may be represented as $111 \ldots 111_{(2)}$. Therefore, 0 may be construed as expressed in the following Equation (2). When a calculator actually performs "$111 \ldots 111_{(2)}+1_{(2)}$", an overflow occurs, and 0 is generated as a result of an addition, whereby a calculation result obtained by adding 0 and a calculation result obtained by adding "$111 \ldots 111_{(2)}+1_{(2)}$" may have the same value:

$$0=-1+1=111\ldots 111_{(2)}+1_{(2)} \quad (2)$$

Referring to a table shown in FIG. 15, a recoding value may correspond to a coefficient which is multiplied to a multiplicand in a partial multiplication. Thus, if a recoding value corresponding to a recoder input corresponds to 0, a partial multiplication result may correspond to 0. That is, unlike an embodiment where a recoding value corresponding to a recoder input having a certain (predetermined) pattern described above is randomized, control signals sel0 to sel3 having two patterns may be randomly generated based on a certain (predetermined) recoding value corresponding to 0 and may be supplied to a partial multiplication calculator. The partial multiplication calculator may be implemented identically to the partial multiplication calculator of FIG. 8.

For example, if a partial multiplication result corresponds to 0, control signals sel0 to sel3 having "0000" and control signals sel0 to sel3 having "1111" may be randomly generated. This may be implemented by adding a random signal generator, which differs from the random signal generator according to the above-described embodiment, into the security processor. Alternatively, according to an embodiment, a random signal from a random signal generator for assigning random characteristic to the above-described recoding operation may be used together for assigning random characteristic based on a partial multiplication result corresponding to 0. For example, when at least one recoder inputs having a certain (predetermined) pattern are converted to a recoding value corresponding to 0, the control signals sel0 to sel3 having "0000" may be generated as a recoding result when a random bit corresponds to 0, and the control signals sel0 to sel3 having "1111" may be generated as a recoding result when a random bit corresponds to 1.

In conclusion, if a partial multiplication result corresponds to 0, bit values of control signals sel0 to sel3 may be randomly changed as shown in FIG. 15. Thus, in a partial multiplication result which is output in FIG. 8, a partial multiplication PPi[n:0] and sign data PPi_neg may all be generated as 0 or 1. That is, a value of "111 . . . 111$_{(2)}$+1$_{(2)}$" may be supplied to an accumulator as a value representing 0.

That is, according to the above-described embodiment, even when an accumulating operation is performed on partial multiplications continuously having a value "0", power consumption is randomly changed, and thus, an SCA is effectively defended.

FIG. 16 is a block diagram illustrating an implementation example of a security processor for performing a multiplication based on numerical values shown in the tables of FIGS. 6 and 15.

Referring to FIG. 16, a security processor 600 may include a calculator 610, a recoder 620, a first random signal generator 631, and a second random signal generator 632. Also, the calculator 610 may include a partial multiplication generator 611 and an accumulator 612.

The security processor 600 may perform a multiplication on a multiplicand A and a multiplier B. For example, the security processor 600 may perform a digit-unit arithmetic operation by performing a recoding operation on a digit-unit bit $b_i$ of the multiplier B. The first random signal generator 631 may generate a first random signal RS1, and the second random signal generator 632 may generate a second random signal RS2. As described above, the first random signal RS1 may be used to randomly change a recoding value, and the second random signal RS2 may be used to randomly change a partial multiplication result.

For example, if a recoder input has a certain (predetermined) pattern, the recoder 620 may randomly change a recoding value corresponding to the certain pattern. For example, if the recoder input has the certain pattern, the recoding value may be randomly changed to −2 or 2, based on a random bit of the first random signal RS1. Also, if the recoding value corresponding to the recoder input has a certain (predetermined) value (for example, 0), the recoder 620 may randomly change a recoding result (for example, control signals). For example, if the recoding value corresponds to 0, the control signals may be randomly changed to "0000" or "1111", based on a random bit of the second random signal RS2. Also, the partial multiplication generator 611 may randomly generate a value of "00000+0" or "11111+1" as a partial multiplication result representing 0, based on the second random signal RS2.

Signs illustrated in FIG. 16 represent an example where if a recoder input corresponds to a certain pattern according to an embodiment, a recoding value is randomly changed to values RV1 and RV2, and represent an example where if a recoding value corresponds to 0, a partial multiplication result from the partial multiplication generator 611 is randomly changed to values PPA and PPB.

Figure 17:
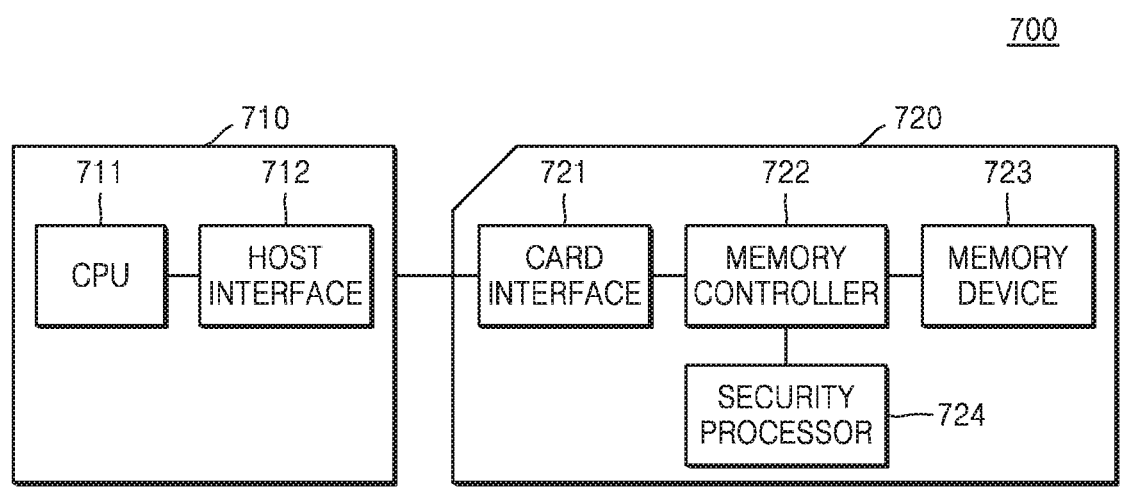
FIG. 17 is a block diagram illustrating an example of a computing system including a smartcard according to an embodiment.

FIG. 17 is a block diagram illustrating an example 700 of a computing system including a smartcard according to an embodiment. Referring to FIG. 17, a computing system 700 may include a host computer 710 and a smartcard 720. The smartcard 720 may include a security processor 724 that performs a recoding operation and a partial multiplication according to the above-described embodiment. The host computer 710 may include a CPU 711 and a host interface 724. The smartcard 720 may include a card interface 721, a memory controller 722, and a memory device 723. The memory controller 722 may control data exchange between the memory device 723 and the card interface 721. According to an embodiment, the card interface 721 may be a secure digital (SD) card interface or a multi-media card (MMC) interface, but is not limited thereto.

Moreover, the card interface 721 according to an embodiment may support various protocols such as a universal serial bus (USB) protocol, an InterChip (IC)-USB protocol, etc. The card interface 721 may denote hardware for supporting a protocol used by the host computer 710, software installed in the hardware, or a signal transmission scheme. When the smartcard 720 accesses a personal computer (PC), a tablet PC, a digital camera, a digital audio player, a mobile phone, console video game hardware, or the host interface 711 of the host computer 710 such as a digital set-top box, the host interface 712 may perform data communication with the memory device 723 through the card interface 721 and the memory controller 722 according to control by the CPU 711.

According to the security processor, the application processor including the same, and the operating method of the security processor, an increase in an area of hardware is minimized, average power consumption or an increase in an overhead of performance is minimized, and an SCA is defended.

While the inventive concepts of the present disclosure haves been particularly shown and described with reference to embodiments thereof, it will be understood that various changes in form and details may be made therein without departing from the spirit and scope of the following claims.

What is claimed is:

1. An operating method of a security processor, the operating method comprising:
   providing a recoder input including a digit-unit multiplier and a reference bit to a recoder of the security processor, wherein the digit-unit multiplier comprises m number of groups each including digit-unit bits corresponding to 2 or more bits, and wherein the reference bit corresponds to a value of an upper significant bit of a group included in a previous recoder input, and wherein the recoder is configured to recognize a plurality of patterns of the recoder input;
   providing a random signal including at least one random bits to the recoder;
   when the recoder input has a predetermined pattern corresponding to at least one of the plurality of patterns of the recoder input, generating a recoding result that is randomized by converting the recoder input into a first recoding value or a second recoding value according to the random signal; and
   performing a partial multiplication based on the recoding result on a multiplicand and the digit-unit multiplier, wherein, when the multiplicand is multiplied by the digit-unit multiplier, a result of the partial multiplication is randomly changed based on the recoding result such that a first partial multiplication result based on the recoder input having the predetermined pattern is randomly differentiated from a second partial multiplication result based on the recoder input having the predetermined pattern, and wherein a compensation for a change in the result of the partial multiplication is performed in a subsequent partial multiplication.

2. The operating method of claim 1, further comprising:
generating a multiplication result of the multiplicand and a multiplier through an accumulating operation on partial multiplication results.

3. The operating method of claim 1, wherein m is an integer equal to or more than one, and
the recoder is configured to recognize eight patterns of the recoder input, and the predetermined pattern corresponds to at least one of the eight patterns.

4. The operating method of claim 3, wherein
when the recoder input is changed to the first recoding value according to the random signal being in a first logic state, a reference bit of a next recoder input corresponds to a value of an upper significant bit of a group included in a current recoder input, and
when the recoder input is changed to the second recoding value according to the random signal being in a second logic state, the reference bit of the next recoder input corresponds to a value obtained by changing the upper significant bit of the group included in the current recoder input.

5. The operating method of claim 1, wherein
the security processor performs in parallel two partial multiplications on two digit-unit multipliers, and
the random signal comprises two random bits, based on the two partial multiplications.

6. The operating method of claim 1, wherein
the digit-unit bits correspond to 2 bits, and the recoder input is changed to one of −2, −1, 0, 1, and 2 as a recoding value, and
when the recoder input has the predetermined pattern, the recoder input is randomly changed to −2 or 2 as the recoding value.

7. The operating method of claim 6, wherein the predetermined pattern comprises a first predetermined pattern corresponding to bit values 011, and a value −2A or 2A is randomly generated as a partial multiplication result corresponding to the recoder input having the first predetermined pattern, wherein A is a multiplicand equal to or more than one.

8. The operating method of claim 7, wherein the predetermined pattern further comprises a second predetermined pattern corresponding to bit values 100, and a value −2A or 2A is randomly generated as a partial multiplication result corresponding to the recoder input having the second predetermined pattern.

9. An operating method of a security processor, the operating method comprising:
generating first to nth control signals through a recoding operation on a recoder input including a digit-unit multiplier and a reference bit, wherein the digit-unit multiplier comprises m number of groups each including digit-unit bits corresponding to 2 or more bits, and wherein the reference bit corresponds to a value of an upper significant bit of a group included in a previous recoder input, and wherein a plurality of patterns of the recoder input are recognizable in the operating method;

generating a partial multiplication result of a partial multiplication on a multiplier and a multiplicand by using the first to nth control signals; and generating a multiplication result of a multiplication on the multiplier and the multiplicand by using the generated partial multiplication result, wherein, in a plurality of recoding operations, the first to nth control signals having bits of a first group and the first to nth control signals having bits of a second group are randomly generated based on a single recoder input having a first pattern corresponding to at least one of the plurality of patterns of the recoder input, and wherein, when the multiplicand is multiplied by the multiplier, the partial multiplication result is randomly changed based on the first to nth control signals such that a first partial multiplication result based on the recoder input having the first pattern is randomly differentiated from a second partial multiplication result based on the recoder input having the first pattern, and wherein a compensation for a change in the partial multiplication result is performed in a subsequent partial multiplication.

10. The operating method of claim 9, further comprising:
generating a random bit having a random value,
wherein
when the random bit is in a first logic state, the first to nth control signals having the bits of the first group are generated based on the recoder input having the first pattern, and
when the random bit is in a second logic state, the first to nth control signals having the bits of the second group are generated based on the recoder input having the first pattern.

11. A security processor, comprising:
a recoder circuit configured to receive a recoder input, including a digit-unit multiplier and a reference bit, and a random signal input, and to generate a recoding result that is randomized, wherein the digit-unit multiplier comprises digit-unit bits corresponding to 2 or more bits, and wherein the reference bit corresponds to a value of an upper significant bit of the digit-unit multiplier of a previous recoder input, and wherein the recoder circuit is configured to recognize a plurality of patterns of the recoder input;

a random signal generator circuit configured to generate the random signal input received by the recoder circuit, wherein when the recoder input has a predetermined pattern corresponding to at least one of the plurality of patterns of the recoder input, the recoder circuit randomly changes the recoder input based on the random signal input so that the recoding result is randomly changed; and a calculator circuit configured to perform a partial multiplication based on the recoding result on a multiplicand of at least two bits and the digit-unit multiplier, wherein, when the multiplicand is multiplied by the digit-unit multiplier, a result of the partial multiplication is randomly changed based on the recoding result such that a first partial multiplication result based on the recoder input having the predetermined pattern is randomly differentiated from a second partial multiplication result based on the recoder input having the predetermined pattern, and wherein a compensation for a change in the result of the partial multiplication is performed in a subsequent partial multiplication.

12. The security processor of claim 11,
wherein the recoder circuit stores a recoding table with conversion information for changing the recoder input to a recoding value based on booth recoding, and
the conversion information comprises a first recoding value and a second recoding value which are randomly changed based on the recoder input having the predetermined pattern.

13. The security processor of claim 11,
wherein the calculator circuit comprises:
a partial multiplication generator circuit configured to generate the result of the partial multiplication on the multiplicand and the digit-unit multiplier; and
an accumulator circuit configured to generate a multiplication result of a multiplication on the multiplicand and the digit-unit multiplier through an accumulating operation on partial multiplication results from the partial multiplication generator circuit.

14. The security processor of claim 11, wherein
the digit-unit bits correspond to 2 bits and
the recoder circuit is configured to recognize eight patterns of the recoder input, and the predetermined pattern corresponds to at least one of the eight patterns.

15. The security processor of claim 14, wherein
the recoder input is changed to one of recoding values of −2, −1, 0, 1, and 2, and
at least one pattern among the eight patterns is changed to the recoding value of 2 or −2 and corresponds to the predetermined pattern.

16. The security processor of claim 14, wherein each of the eight patterns corresponds to the predetermined pattern.

17. The security processor of claim 11, wherein
the recoder input has the predetermined pattern,
when the random signal input has a first logic state, the recoder input is a first recoding value and a first recoding result corresponding to the first recoding value is output, and
when the random signal input has a second logic state, the recoder circuit changes the recoder input to a second recoding value and a second recoding result corresponding to the second recoding value is output.

18. The security processor of claim 17, wherein
when the recoder input is the first recoding value, a reference bit of a next recoder input corresponds to a value of an upper significant bit of a current digit-unit multiplier in the recoder input, and
when the recoder input is changed to the second recoding value, the reference bit of the next recoder input corresponds to a value obtained by changing the upper significant bit of the current digit-unit multiplier.

19. The operating method of claim 9, wherein the multiplier comprises m number of bit groups each including digit-unit bits, the recoder input comprises bits of a second bit group and a first reference bit, and the first reference bit corresponds to an upper significant bit of a first bit group included in a previous recoder input, wherein m is an integer equal to or more than one.

20. The operating method of claim 19, further comprising:
performing a recoding operation on the recoder input, wherein the recoder input includes bits of a third bit group and a second reference bit,
wherein the second reference bit corresponds to one of an upper significant bit of the second bit group or a value obtained by inverting the upper significant bit of the second bit group, based on a recoding result and based on the recoder input having the first pattern.

* * * * *